US010762224B2

(12) United States Patent
Chao et al.

(10) Patent No.: US 10,762,224 B2
(45) Date of Patent: Sep. 1, 2020

(54) DOCUMENT PROVIDING METHOD AND APPARATUS

(71) Applicants:Beijing Kingsoft Office Software, Inc., Beijing (CN); Zhuhai Kingsoft Office Software Co., Ltd., Zhuhai, Guangdong (CN)

(72) Inventors: Yuntong Chao, Jida Zhuhai (CN); Huan Liu, Jida Zhuhai (CN); Zhishou Huang, Jida Zhuhai (CN); Chuantong Huang, Jida Zhuhai (CN); Ruilong Li, Jida Zhuhai (CN)

(73) Assignees: Zhuhai Kingsoft Office Software Co., Ltd., Zhuhai, Guangdong (CN); Beijing Kingsoft Office Software, Inc., Beijing (CN)

( * ) Notice: Subject to any disclaimer, the term of this patent is extended or adjusted under 35 U.S.C. 154(b) by 406 days.

(21) Appl. No.: 15/108,150

(22) PCT Filed: Dec. 3, 2014

(86) PCT No.: PCT/CN2014/092932
§ 371 (c)(1),
(2) Date: Jun. 24, 2016

(87) PCT Pub. No.: WO2015/096603
PCT Pub. Date: Jul. 2, 2015

(65) Prior Publication Data
US 2016/0328570 A1 Nov. 10, 2016

(30) Foreign Application Priority Data
Dec. 26, 2013 (CN) .......................... 2013 1 0737248

(51) Int. Cl.
*G06F 21/62* (2013.01)
*G06F 16/93* (2019.01)
(Continued)

(52) U.S. Cl.
CPC .......... *G06F 21/6209* (2013.01); *G06F 16/93* (2019.01); *G06F 16/9566* (2019.01); *G06F 40/134* (2020.01)

(58) Field of Classification Search
None
See application file for complete search history.

(56) References Cited

U.S. PATENT DOCUMENTS 5,724,578 A * 3/1998 Morinaga ........... G06F 21/6281
8,732,853 B1 * 5/2014 Byrne ................. H04L 63/0838
726/28

(Continued)

FOREIGN PATENT DOCUMENTS

CN 102164122 A 8/2011
CN 102929985 A 2/2013
(Continued)

OTHER PUBLICATIONS

Conner, Nancy, "Google Apps: The Missing Manual, 1st Edition," Chapters Introduction and 2.1, 2.2, 2.4 and 2.7, Jun. 3, 2008, all pages (Year: 2008).*

(Continued)

*Primary Examiner* — Richard L Bowen
(74) *Attorney, Agent, or Firm* — Wolf, Greenfield & Sacks, P.C.

(57) ABSTRACT

Disclosed are a document providing method and apparatus. The method comprises: receiving an access request to a target document that is sent by a user; determining whether an access link used by the user is valid; if the access link is invalid, further determining whether the user identifies the access link before the access link is invalid; and if yes, providing the target document for the user. According to this application, by providing a document providing method and apparatus, when the access link is invalid, it is further determined whether the user identifies the access link before (Continued)

the access link is invalid, and if yes, the target document is provided for the user, so that a user that obtains the document provided by the access link when the access link is valid can obtain the document provided by the access link again after the access link is invalid, thereby providing convenience for the user to obtain the document.

6 Claims, 1 Drawing Sheet

(51) Int. Cl.
  *G06F 16/955* (2019.01)
  *G06F 40/134* (2020.01)

(56) References Cited

U.S. PATENT DOCUMENTS

| | | | | |
|---|---|---|---|---|
| 9,832,532 | B1* | 11/2017 | Agabob | H04N 21/47815 |
| 10,217,142 | B1* | 2/2019 | Chordia | G06Q 30/0282 |
| 2001/0034639 | A1* | 10/2001 | Jacoby | G06Q 30/02 |
| | | | | 705/7.32 |
| 2003/0160823 | A1* | 8/2003 | Stannard | G06F 21/10 |
| | | | | 715/764 |
| 2004/0133463 | A1* | 7/2004 | Benderev | G06Q 30/02 |
| | | | | 705/14.19 |
| 2005/0044224 | A1* | 2/2005 | Jun | G06Q 20/10 |
| | | | | 709/225 |
| 2009/0089378 | A1* | 4/2009 | Maresh | G06Q 10/107 |
| | | | | 709/206 |
| 2010/0058434 | A1* | 3/2010 | Chusing | G06F 21/604 |
| | | | | 726/1 |
| 2010/0100565 | A1 | 4/2010 | Adachi | |
| 2011/0202912 | A1* | 8/2011 | Itoh | G06F 8/61 |
| | | | | 717/177 |
| 2013/0067594 | A1* | 3/2013 | Kantor | G06F 21/6218 |
| | | | | 726/28 |
| 2013/0232189 | A1* | 9/2013 | Lewis | G06Q 30/02 |
| | | | | 709/203 |

FOREIGN PATENT DOCUMENTS

| | | |
|---|---|---|
| CN | 103119621 A | 5/2013 |
| JP | H11-31150 A | 2/1999 |
| JP | 2003-132002 A | 5/2003 |
| JP | 2010-249219 A | 11/2010 |
| JP | 2011-170435 A | 9/2011 |

OTHER PUBLICATIONS

International Search Report and Written Opinion for Application No. PCT/CN2014/092932 dated Mar. 6, 2015.

* cited by examiner

DOCUMENT PROVIDING METHOD AND APPARATUS

CROSS REFERENCE TO RELATED APPLICATIONS

The present application is the National Phase under 35 U.S.C. § 371 of PCT International Application No. PCT/CN2014/092932, filed Dec. 3, 2014, which claims priority to Chinese Patent Application No. 201310737248.1, filed on Dec. 26, 2013, and entitled "Document Providing Method and Apparatus", the entire contents of which are hereby incorporated into the present application by reference herein in their entirety.

The present application claims priority to Chinese Patent Application No. 201310737248.1, filed on Dec. 26, 2013, and entitled "Document Providing Method and Apparatus", which is hereby incorporated into the present application by reference herein in its entirety.

TECHNICAL FIELD

The present application relates to the technical field of Internet application, and particularly to a method and device for providing a document.

BACKGROUND

With the development of the communication technology, people can provide a document to clients or business partners by an access link and a user having the access link can obtain the document provided by the access link by clicking on it.

In prior art, a method for providing a document comprises: receiving an access request sent by a user for a target document and determining whether an access link used by the user is valid; if the access link is valid, then providing the target document to the user; if the access link becomes invalid, the document provided by the access link will not be accessible by clicking on the access link by anyone.

However, the user who has obtained the document provided by the access link when the access link is valid cannot access the document provided by the access link any more after the access link becomes invalid. In this case, the document provider is required to reset the access link and thus other users can obtain the document again, which is inconvenient for the document provider to use or the object to whom the document is shared.

SUMMARY

An objective of the embodiments of the present application is to provide a method and device for providing a document so as to reduce the inconvenience for users.

In order to achieve the above objective, embodiments of the present application disclose a method and device for providing a document, which the technical solutions thereof is provided as follows.

In a first aspect, embodiments of the present application provide a method for providing a document, comprising:

receiving an access request sent by a user for a target document;

determining whether an access link used by the user is valid;

if the access link is invalid, then further determining whether the user has identified the access link before the access link becomes invalid;

if the user has identified the access link before the access link becomes invalid, providing the target document to the user.

Preferably, the determining whether an access link used by the user is valid comprises:

determining whether the number of times the user uses the access link exceeds a preset threshold of the number of times for accessing the access link, if yes, determining that the access link is invalid, and otherwise, determining that the access link is valid.

Preferably, the determining whether an access link used by the user is valid comprises:

determining whether the current accessing time of the user is within a preset validity period of the access link;

if yes, determining that the access link is invalid, and otherwise, determining that the access link is valid.

Preferably, the determining whether the user has identified the access link before the access link becomes invalid comprises:

determining whether the user has clicked on the access link, obtained the document provided by the access link and identified the access link before the access link becomes invalid.

Preferably, the identifying the access link comprises:

adding the access link to favorites; or, copying the access link; or, forwarding the access link.

In a second aspect, embodiments of the present application provide a device for providing a document, comprising:

an access request receiving module used for receiving an access request sent by a user for a target document;

a first determining module used for determining whether an access link used by the user is valid;

a second determining module used for further determining whether the user has identified the access link before the access link becomes invalid when the first determining module determines the access link used by the user is invalid;

a document providing module used for providing the target document to the user when the second determining module determines that the user has identified the access link before the access link becomes invalid.

Preferably, the first determining module is specifically used for:

determining whether the number of times the user uses the access link exceeds a preset threshold of the number of times for accessing the access link, if yes, determining that the access link is invalid, and otherwise, determining that the access link is valid.

Preferably, the first determining module is specifically used for:

determining whether the current accessing time of the user is within a preset validity period of the access link;

if yes, determining that the access link is valid, and otherwise, determining that the access link is invalid.

Preferably, the second determining module is specifically used for:

determining whether the user has clicked the access link, obtained the document provided by the access link and identified the access link before the access link becomes invalid.

Preferably, identifying the access link comprises:

adding the access link to favorites; or, copying the access link; or, forwarding the access link.

In a third aspect, embodiments of the present application further provide an electronic apparatus comprising:

a processor, a memory, communication interfaces and a bus;

the processor, the memory and the communication interfaces connect to and communicate with each other by the bus;

the memory stores executable program codes;

the processor executes the program corresponding to the executable program codes by reading the executable program codes stored in the memory, so as to carry out any one of the methods for providing a document provided by embodiments of the present application.

In a fourth aspect, embodiments of the present application further provide an storage medium which is used to store an application program that is used to carry out any one of the methods for providing a document provided by the embodiments of the present application.

In a fifth aspect, embodiments of the present application further provide an application program which is used to carry out any one of the methods for providing a document provided by the embodiments of the present application.

It can be seen from the above technical solutions that embodiments of the present application provide a method and device for providing a document. When the access link is invalid, it is further determined whether the user has identified the access link before the access link becomes invalid and if yes, the document is provided to the user, such that an user who obtained the document provided by the access link when the access link is valid can obtain the document provided by the access link again when the access link becomes invalid, thus providing convenience for the user to obtain documents.

BRIEF DESCRIPTION OF THE DRAWINGS

In order to describe embodiments of the present application and technical solutions in prior art more clearly, appended drawings required to use in embodiments and prior art will be described briefly below. Apparently, the appended drawings described below are only some embodiments of the present application, and ordinary skill in the art can also obtain further drawings depending on these drawings without doing creative efforts.

DETAILED DESCRIPTION

Figure 1:
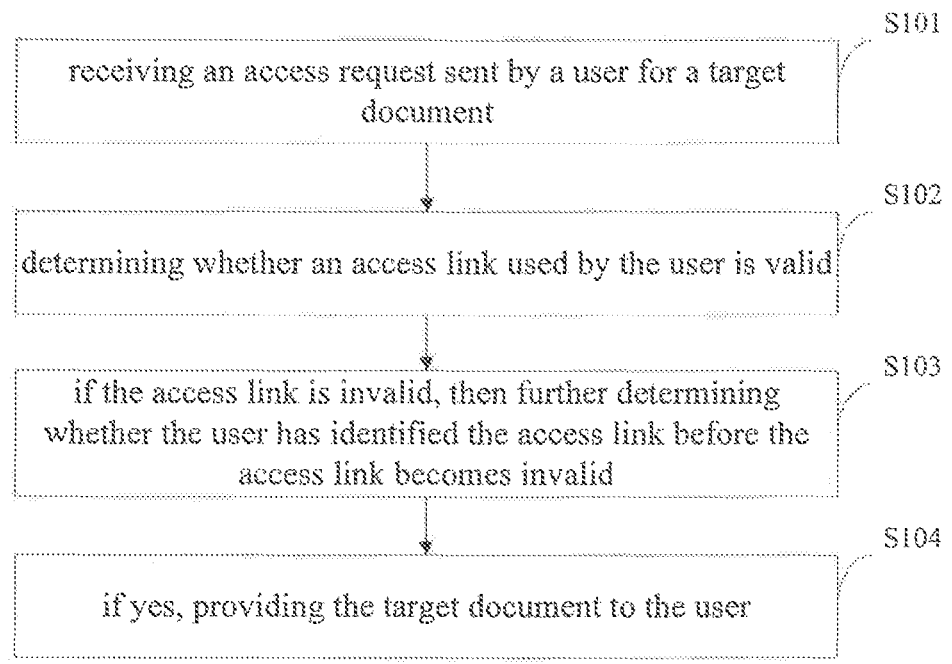
FIG. 1 is a schematic flowchart of the method for providing a document provided by an embodiment of the present application.

According to the prior art, after obtaining an access link published by a document provider, a user clicks on the access link within a valid period of the access link and obtains the document provided by the access link, but the user does not save the document. After the access link becomes invalid, since the user cannot obtain the document provided by the access link again, the document provider is required to reset and republish the access link such that the user or other users can obtain the document again, which is inconvenient for the document provider and the object to whom the document is shared.

In view of the problem above, embodiments of the present application provide a method for providing a document, and the method may comprise the following steps of:

receiving an access request sent by a user for a target document;

determining whether an access link used by the user is valid;

if the access link has become invalid, then further determining whether the user has identified the access link before the access link becomes invalid;

if the user has identified the access link before the access link becomes invalid, providing the target document to the user.

In the above method provided by the embodiment of the present application, the system in which the method is applied can be a server, or can also be other apparatuses with similar functions in addition to a server. A user sends an access request for a target document to a server by clicking on an access link provided by the server; the server determines whether the access link used by the user becomes invalid after receiving the access request for the target document; when the access link is invalid, it is further determined whether the user has identified the access link before the access link becomes invalid and if yes, the document is provided to the user such that the user who accessed the document provided by the access link when the access link is valid can access the document provided by the access link again when the access link is invalid, which is convenient for the user to obtain the document.

In the embodiments of the present application, a document provider can also set a canceling strategy with a higher priority, which invalids the access link for everyone. The document provider can adopt the canceling strategy at any time and when the document provider adopt the canceling strategy, the access link becomes invalid immediately. Therefore, the method comprises:

receiving an access request sent by a user for a target document;

determining whether the document provider has adopt the canceling strategy;

if yes, then not providing the target document to anymore; and if not, continuing the following steps:

determining whether an access link used by the user is valid;

if the access link has become invalid, then further determining whether the user has identified the access link before the access link becomes invalid;

if yes, providing the target document to the user.

Alternatively, the method for providing a document may comprise that:

when receiving an access request sent by a user for a target document, the system determines whether the access link used by the user is valid; if the access link has become invalid, then it is further determined whether the user has identified the access link before the access link becomes invalid; if yes, it is determined whether the target document has been provided to the user after the access link has become invalid, if not, the target document is provided to the user, or otherwise the target document is provided.

The above method thus prevents the user who has identified the access link from obtaining the privilege to access the document unlimitedly, and thereby further enhancing the control to the target document provided, which ensures the safety of the document content in certain cases.

Technical solutions in the embodiments of the present application will be described clearly and completely in combination with the appended drawings in embodiments of the present invention. Apparently, the described embodiments are only some of embodiments of the present application, rather than all the embodiments. Based on embodiments in the present application, all other embodiments obtained by ordinary skills in the art without doing creative efforts fall in the protection scope of the present application.

As shown in FIG. 1, which is a schematic flowchart of the method for providing a document provided by an embodiment of the present invention, the method may comprise the following steps.

In S101: an access request sent by a user for a target document is received.

A document provider stores the document provided to a server and generates an access link according to the location of the document. During the process of generating the access link, the document provider may set a document password to ensure the confidentiality of the document or may not. Any user having received the access link can click on this access link and access the document provided by the access link. The document provider may send the access link to colleagues, clients or business partners together with the preset password, if any.

A user having received the access link clicks on the access link when the user needs the document provided by the access link, which will trigger the sending of an access request for the target document, and thereby the server receives the access request sent by the user for the target document.

In S102: it is determined whether an access link used by the user is valid.

After receiving the access request sent by the user for the target document, it is determined whether the access link used by the user is valid according to the access request.

During the process of generating the access link, the document provider can set validity rules of the access link such that the access link is valid within the validity rules and becomes invalid automatically when the set validity rules is exceeded. Wherein, the validity rules may comprise a preset threshold of the number of times for accessing the access link, a preset validity period of the access link or a preset threshold of the number of times for downloading the document through the access link.

In the embodiments of the present application, the validity rules of the access link may be set with only one of the rules for determining whether the access link used by the user satisfies this one rule, and if yes, it is determined that the access link is valid, and otherwise, it is determined that the access is invalid.

For example, only the preset threshold of the number of times for accessing the access link is set, for determining whether the number of times a user uses the access link exceeds the preset threshold of the number of times for accessing the access link, and if yes, it is determined that the access link is invalid, and otherwise, it is determined that the access link is valid.

The validity rules of the access link may also be set with a plurality of rules, for determining whether the access link used by the user satisfies the plurality of set rules, and if yes, it is determined that the access link is valid, and otherwise, it is determined that the access is invalid.

For example, the preset threshold of the number of times for accessing the access link, the preset validity period of the access link and the preset threshold of the number of times for downloading the document through the access link are set, for determining whether the number of times a user uses the access link exceeds the preset threshold of the number of times for accessing the access link, determining whether the current accessing time of the user is within the preset validity period of the access link, and determining whether the number of times the user has saved the document through the access link exceeds the preset threshold of the number of times for downloading the document through the access link one by one; and if it is determined that at least one of the validity rules is exceeded, then it is determined that the access link is invalid, and otherwise, it is determined that the access link is valid. Wherein, the sequence of determination may be: firstly determining whether the access link used by the user satisfies the first validity rule, and if yes, continuing to determine the second validity rule until all the validity rules set are determined, and otherwise, it is determined that the access link used by the user is invalid and the determining of the next validity rule is terminated. In the present application, the sequence of determining whether the number of times a user uses the access link exceeds the preset threshold of the number of times for accessing the access link, determining whether the current accessing time of the user is within the preset validity period of the access link, and determining whether the number of times the user has saved the document through the access link exceeds the preset threshold of the number of times for downloading the document through the access link is not specified. That is to say, in actual applications, it is possible to preset the specific sequence of determination for the plurality of rules or to determine the specific sequence of determination randomly by the system, which are both reasonable.

In the embodiments of the present application, the number of the validity rules of the access link can be specifically set according to the preference of the document provider, which is not specifically limited here.

In S103: if the access link becomes invalid, then it is further determined whether the user has identified the access link before the access link becomes invalid;

S104: if yes, the target document is provided to the user.

Wherein, for the steps of S103 and S104, if the access link is valid, the target document is provided to the user.

If the user needs to access the access link and obtain the document provided by the access link after the access link becomes invalid, then one or more of the following operations is required to be completed before the access link becomes invalid:

a. clicking on the access link;
b. obtaining the document provided by the access link;
c. identifying the access link.

The conditions that a user who can continue to obtain the document provided by the access link after the access link become invalid needs to meet may be specifically set according to the document provider. The user may only meet the first one, or meet both a and b simultaneously, or may meet a, b, and c simultaneously. It is not specifically limited here by the embodiments of the present application.

Wherein, the step of determining whether the user has identified the access link before the access link becomes invalid may specifically comprise, but be not limited to, the following contents:

determining whether the user has added the access link to favorites before the access link becomes invalid; or, determining whether the user has copied the access link before the access link becomes invalid; or, determining whether the user has forwarded the access link before the access link becomes invalid; or, determining whether the user has commented the webpage of the access link before the access link becomes invalid; or, determining whether the user has gave the webpage of the access link a good rating before the access link becomes invalid and the like.

Wherein, regarding the above contents of identifying of the access link, it can be set such that meeting only one of the above identifying actions on the access link represents the identifying of the access link. It can also be set such that meeting some of the above identifying actions on the access link simultaneously represents the identifying of the access link.

In the embodiments of the present application, the contents of identifying of the access link by the user may be determined based on the settings of the document provider.

According to the solutions provided by the embodiments of the present application, a user can continue to click on the access link and obtain the document provided by the access link after the access link becomes invalid by identifying the access link before the access link becomes invalid, which is convenient for the user to obtain the document.

The solutions of the present application will be illustrated in combination with a specific example.

It may assume that a document provider provides a document named "a method for providing a document.doc", then generates an access link "http://abc.com/file/aa" according to the document location, sets the password for the document to be 123456, and sets the preset validity period of the access link to be 7 days, i.e., January 1 to January 7. As long as one of the contents of identifying of the access link, i.e., adding to favorites, copying, forwarding, commenting or giving a good rating is done, then it is determined that the user has identified the access link. Then the document provider will send the access link and the password of the document to the sharing users A, B, and C.

Wherein, the user A clicked on the access link on January 2 and according to S101, the server received the access request sent by the user A for the target document "a method for providing a document. doc".

According to S102, according to the access request sent by the user A for the target document, it is determined whether the current time of using the access link by the user is within January 1 to January 7. It is determined that the access link used by the user A is valid since the current time of clicking on the access link by the user A was January 2, and thereby the server provides the target document "a method for providing a document.doc" to the user A.

The user A clicked on the access link on January 9 again and according to S101, the server received the access request sent by the user A for the target document "a method for providing a document.doc";

According to S102, according to the access request sent by the user A for the target document, it is determined whether the current time of using the access link by the user A is within January 1 to January 7. It is determined that the access link used by the user A is invalid since the current time of clicking on the access link by the user A was January 9;

According to S103, since the access link used by the user A is invalid, it is further determined whether the user A has performed at least one of adding to favorites, copying, forwarding, commenting, giving a good rating before the access link becomes invalid; if yes, then it is determined that the user A has identified the access link before the access link becomes invalid; and according to S104, the target document "a method for providing a document. doc" is provided to the user A, and otherwise, it is determined that the user A has not identified the access link before the access link becomes invalid and the target document will not be provided to the user A;

Wherein, the user B clicked on the access link on January 10 and according to S101, the server received the access request sent by the user B for the target document "a method for providing a document.doc";

According to S102, according to the access request sent by the user B for the target document, it is determined whether the current time of using the access link by the user B is within January 1 to January 7. It is determined that the access link used by the user B is invalid since the current time of clicking on the access link by the user B is January 10.

According to S103, since the access link used by the user B is invalid, it is further determined whether the user B has carried out at least one of adding to favorites, copying, forwarding, commenting and giving a good rating before the used access link becomes invalid, and the target document will not be provided to the user B since it is determined that the user did not click on the access link from January 1 to January 7.

In the embodiment of the present application, when an access link is invalid, it is further determined whether a user has identified the access link before the access link becomes invalid and if yes, the document is provided to the user, and otherwise, the document will not be provided to the user. In this way, the user who accessed the document provided by the access link when the access link is valid can access the document provided by the access link again when the access link becomes invalid, which is convenient for the user to obtain the document.

Figure 2:
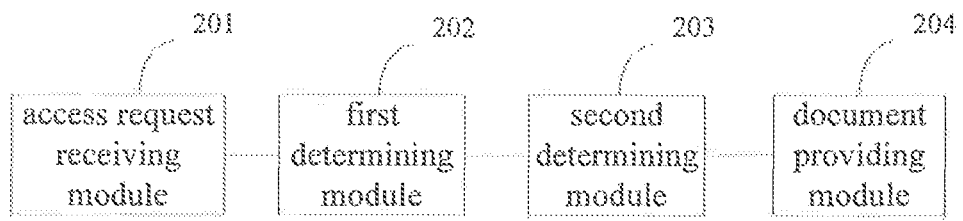
FIG. 2 is a schematic structure view of the device for providing a document provided by an embodiment of the present application.

Corresponding to the above method in the embodiments, the present application further provides a device for providing a document, and as shown in FIG. 2, the device may comprise:

an access request receiving module 201 for receiving an access request sent by a user for a target document.

A document provider stores the document provided to a server and generates an access link according to the location of the document. During the process of generating the access link, the document provider may set a document password to ensure the confidentiality of the document or may not. Any user having received the access link can click on this access link and obtain the document provided by the access link. The document provider may send the access link to colleagues, clients or business partners together with the preset password, if any.

The user having received the access link clicks on the access link when the user needs the document provided by the access link, which will trigger the sending of an access request for the target document, and thereby the server receives the access request sent by the user for the target document.

A first determining module 202 for determining whether the access link used by the user is valid;

After receiving the access request sent by the user for the target document, the first determining module determines whether the access link used by the user is valid according to the access request.

During the process of generating the access link, the document provider can set validity rules of the access link such that the access link is valid within the validity rules and becomes invalid automatically when the set validity rules is exceeded. Wherein, the validity rules may comprise a preset threshold of the number of times for accessing the access link, a preset validity period of the access link or a preset threshold of the number of times for downloading the document through the access link.

In the embodiments of the present application, the validity rules of the access link may be set with only one of the rules for determining whether the access link used by the user satisfies this one rule, and if yes, it is determined that the access link is valid, otherwise, it is determined that the access is invalid.

For example, only the preset threshold of the number of times for accessing the access link is set, for determining whether the number of times a user uses the access link exceeds the preset threshold of the number of times for accessing the access link, and if yes, it is determined that the access link is invalid, otherwise, it is determined that the access link is valid.

The validity rules of the access link may also be set with a plurality of rules for determining whether the access link used by the user satisfies the plurality of set rules, and if yes, it is determined that the access link is valid, otherwise, it is determined that the access is invalid.

For example, the preset threshold of the number of times for accessing the access link, the preset validity period of the access link and the preset threshold of the number of times for downloading the document through the access link are set, for determining whether the number of times a user uses the access link exceeds the preset threshold of the number of times for accessing the access link, determining whether the current accessing time of the user is within the preset validity period of the access link, and determining whether the number of times the user has saved the document through the access link exceeds the preset threshold of the number of times for downloading the document through the access link one by one; and if it is determined that at least one of the validity rules is exceeded, then it is determined that the access link is invalid, and otherwise, it is determined that the access link is valid. Wherein, the sequence of determination may by: firstly determining whether the access link used by the user satisfies the first validity rule, and if yes, continuing to determine the second validity rule until all the validity rules are determined, otherwise, it is determined that the access link used by the user is invalid and the determining of the next validity rule is terminated.

In the present application, the sequence of determining whether the number of times a user uses the access link exceeds the preset threshold of the number of times for accessing the access link, determining whether the current accessing time of the user is within the preset validity period of the access link, and determining whether the number of times the user has saved the document through the access link exceeds the preset threshold of the number of times for downloading the document through the access link is not specified.

In the embodiments of the present application, the number of the validity rules of the access link can be specifically set according to the preference of the document provider, which is not specifically limited here.

A second determining module 203 is used for, when the first determining module determines the access link invalid, further determining whether the user has identified the access link before the access link becomes invalid.

A document providing module 204 is used for providing the target document to the user when the result of determination by the second determining module is "yes".

If the user needs to access the access link and obtain the document provided by the access link after the access link becomes invalid, then one or more of the following operations is required to be completed before the access link becomes invalid:

a. clicking on the access link;
b. obtaining the document provided by the access link;
c. identifying the access link.

The conditions that a user who can continue to obtain the document provided by the access link after the access link become invalid needs to meet may be specifically set according to the document provider. The user may only meet the first one, or meet both a and b simultaneously, or may meet a, b, and c simultaneously. It is not specifically limited here by the embodiments of the present application.

Wherein, the step of determining whether the user has identified the access link before the access link becomes invalid may specifically comprise, but be not limited to, the following contents:

determining whether the user has added the access link to favorites before the access link becomes invalid; or, determining whether the user has copied the access link before the access link becomes invalid; or, determining whether the user has forwarded the access link before the access link becomes invalid; or, determining whether the user has commented the webpage of the access link before the access link becomes invalid; or, determining whether the user has gave the webpage of the access link a good rating before the access link becomes invalid and the like.

Wherein, regarding the above contents of identifying of the access link, it can be set such that meeting only one of the above identifying of the access link represents the identifying of the access link. It can also be set such that meeting some of the above identifying of the access link simultaneously represents the identifying of the access link.

In the embodiments of the present application, the contents of identifying of the access link by the user may be determined based on the settings of the document provider.

According to the solutions provided by the embodiments of the present application, a user can continue to click on the access link and obtain the document provided by the access link after the access link becomes invalid by identifying the access link before the access link becomes invalid, which is convenient for the user to obtain the document.

In addition, embodiments of the present application further provide an electronic apparatus which may comprise:

a processor, a memory, communication interfaces and a bus;

the processor, the memory and the communication interfaces connect to and communicate with each other by the bus;

the memory stores executable program codes;

the processor executes the program corresponding to the executable program codes by reading the executable program codes stored in the memory, so as to carry out the method for providing a document provided by the embodiments of the present application; wherein the method for providing a document provided by the embodiments of the present application may comprise:

receiving an access request sent by a user for a target document;

determining whether an access link used by the user is valid;

if the access link has become invalid, then further determining whether the user has identified the access link before the access link becomes invalid;

if yes, providing the target document to the user.

In a first implementation, the determining whether the access link used by the user is valid may comprise:

determining whether the number of times the user uses the access link exceeds a preset threshold of the number of times for accessing the access link, if yes, determining that the access link is invalid, and otherwise, determining that the access link is valid.

In a second implementation, the determining whether the access link used by the user is valid may comprise:

determining whether the current accessing time of the user is within a preset validity period of the access link;

if yes, determining that the access link is valid, and otherwise, determining that the access link is invalid.

In a third implementation, the determining whether the user has identified the access link before the access link becomes invalid may comprise:

determining whether the user has clicked on the access link, obtained the document provided by the access link and identified the access link before the access link becomes invalid.

Specifically, the identifying the access link may comprise:
adding the access link to favorites; or,
copying the access link; or,
forwarding the access link.

In addition, embodiment of the present application further provides a storage medium used for storing an application program, wherein the application program is used for carrying out the method for providing a document provided by the embodiments of the present application; wherein the method for providing a document provided by the embodiments of the present application may comprise:

receiving an access request sent by a user for a target document;

determining whether an access link used by the user is valid;

if the access link is invalid, then further determining whether the user has identified the access link before the access link becomes invalid;

if yes, providing the target document to the user.

In a first implementation, the determining whether the access link used by the user is valid may comprise:

determining whether the number of times the user uses the access link exceeds a preset threshold of the number of times for accessing the access link, if yes, determining that the access link is invalid, and otherwise, determining that the access link is valid.

In a second implementation, the determining whether the access link used by the user is valid may comprise:

determining whether the current accessing time of the user is within a preset validity period of the access link;

if yes, determining that the access link is valid, and otherwise, determining that the access is invalid.

In a third implementation, the determining whether the user has identified the access link before the access link is invalid may comprise:

determining whether the user has clicked on the access link, obtained the document provided by the access link and identified the access link before the access link becomes invalid.

Specifically, identifying the access link may comprise:
adding the access link to favorites; or,
copying the access link; or,
forwarding the access link.

In addition, embodiment of the present application further provides an application program, wherein the application program is used for carrying out the method for providing a document provided by the embodiments of the present application; wherein the method for providing a document provided by the embodiments of the present application may comprise:

receiving an access request sent by a user for a target document;

determining whether an access link used by the user is valid;

if the access link is invalid, then further determining whether the user has identified the access link before the access link becomes invalid;

if yes, providing the target document to the user.

In a first implementation, the determining whether the access link used by the user is valid may comprise:

determining whether the number of times the user uses the access link exceeds a preset threshold of the number of times for accessing the access link, if yes, determining that the access link is invalid, and otherwise, determining that the access link is valid.

In a second implementation, the determining whether the access link used by the user is valid may comprise:

determining whether the current accessing time of the user is within a preset validity period of the access link;

if yes, determining that the access link is valid, and otherwise, determining that the access link is invalid.

In a third implementation, the determining whether the user has identified the access link before the access link is invalid may comprise:

determining whether the user has clicked on the access link, obtained the document provided by the access link and identified the access link before the access link becomes invalid.

Specifically, identifying the access link may comprise:
adding the access link to favorites; or,
copying the access link; or,
forwarding the access link.

It should be noted that the relation terms herein such as "first" and "second" or the like are only used to differ one instance or operation from another instance or operation, and there may be no requirements or implies that there are actual relation or order like this among these instances or operations. Moreover, terms like "include", "comprise" or other variants, are intended to cover a non-exclusive inclusion, such that processes, methods, objects or devices comprising a series of elements not only comprise those elements, but also comprise other elements not listed specifically or the intrinsic elements comprised in these processes, methods, objects, or devices. Without more limitations, elements limited by sentences "comprise(s) a . . . " don't exclude that there are other identical elements in the processes, methods, objects, or devices which comprise these elements.

Various embodiments in this description are described in a manner that they are associated with each other. Identical or similar parts among these various embodiments can be obtained with reference to each other, and each embodiment emphasizes the differences between itself and other embodiments. Particularly, embodiments of the device are described relatively briefly compared to embodiments of the method because they are substantially similar to embodiments of the method, and the associated parts can be obtained with reference to the description of these parts of embodiments of the method.

It will be appreciated to ordinary skills in the art that all or a part of the steps in embodiments which can implement the method described above can be implemented by relative hardware instructed by programs which can be stored in computer readable storage medium such as ROM/RAM, magnetic disk, optical disk or the like.

Embodiments described above are just preferred embodiments of the present invention, and not indented to limit the scope of the present invention. Any modifications, alternatives, improvements or the like within the spirit and principle of the present invention are included in the scope of the present invention.

The invention claimed is:

1. A method for providing a document, characterized in that the method comprises:

receiving an access request for the document sent by a user using an access link;

determining that a provider of the document has not adopted a canceling strategy which invalidates the access link for everyone;

determining that the access link used by the user is invalid;

after determining that the access link used by the user is invalid, determining that the user has identified the access link before the access link becomes invalid, wherein the determining that the access link used by the user is invalid comprises determining that the number of times the user uses the access link exceeds a preset threshold of the number of times for accessing the access link, and wherein the determining that the user has identified the access link comprises determining that the user has given a webpage of the access link a good rating; and providing the document to the user in responding to determining that the access link used by the user is invalid and determining that the user has identified the access link before the access link becomes invalid, wherein when determining that the user has not identified the access link before the access link becomes invalid, the document is not provided to the user.

2. The method for providing a document according to claim 1, characterized in that the determining that the an access link used by the user is valid comprises:

determining that the current accessing time of the user is within a preset validity period of the access link.

3. An electronic apparatus, characterized in that it comprises:

a processor, a memory, communication interfaces and a bus;

the processor, the memory and the communication interfaces connect to and communicate with each other by the bus;

the memory stores executable program codes;

the processor executes the program corresponding to the executable program codes by reading the executable program codes stored in the memory, so as to carry out the method for providing a document according to claim 1.

4. A non-transitory storage medium, characterized in that it is used for storing an application program, the application program being used for carrying out the method for providing a document according to claim 1.

5. A device for providing a document, characterized in that the device comprises:

an access request receiving module used for receiving an access request for the document sent by a user using an access link;

a first determining module used for determining that a provider of the document has not adopted a canceling strategy which invalidates the access link for everyone;

a second determining module used for determining that the access link used by the user is invalid and used for, after determining that the access link used by the user is invalid, determining that the user has identified the access link before the access link becomes invalid, wherein the determining that the access link used by the user is invalid comprises determining that the number of times the user uses the access link exceeds a preset threshold of the number of times for accessing the access link, and wherein the determining that the user has identified the access link comprises determining that the user has given a webpage of the access link a good rating; and a document providing module used for providing the document to the user in responding to determining that the access link used by the user is invalid and determining that the user has identified the access link before the access link becomes invalid, wherein when determining that the user has not identified the access link before the access link becomes invalid, the document is not provided to the user.

6. The device for providing a document according to claim 5, characterized in that the first determining module is specifically used for:

determining that the current accessing time of the user is within a preset validity period of the access link.

* * * * *

UNITED STATES PATENT AND TRADEMARK OFFICE
CERTIFICATE OF CORRECTION

PATENT NO. : 10,762,224 B2  
APPLICATION NO. : 15/108150  
DATED : September 1, 2020  
INVENTOR(S) : Yuntong Chao et al.

Page 1 of 1

It is certified that error appears in the above-identified patent and that said Letters Patent is hereby corrected as shown below:

On the Title Page

Item (73) Assignees should be corrected to read:  
Beijing Kingsoft Office Software, Inc., Beijing (CN);  
Zhuhai Kingsoft Office Software Co., Ltd., Zhuhai, Guangdong (CN)

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*